(12) United States Patent
Woo et al.

(10) Patent No.: US 10,593,132 B2
(45) Date of Patent: Mar. 17, 2020

(54) SYSTEM FOR CONTROLLING INPUT INTERFACE FOR RECEIVING CONTROL COMMAND OF VEHICLE AND CONTROL METHOD THEREOF

(71) Applicants: HYUNDAI MOTOR COMPANY, Seoul (KR); KIA MOTORS CORPORATION, Seoul (KR)

(72) Inventors: Seunghyun Woo, Seou (KR); Seok young Youn, Seoul (KR); Gi Beom Hong, Bucheon-si (KR); Daeyun An, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 268 days.

(21) Appl. No.: 15/618,167

(22) Filed: Jun. 9, 2017

(65) Prior Publication Data
US 2018/0182180 A1   Jun. 28, 2018

(30) Foreign Application Priority Data
Dec. 26, 2016   (KR) .......................... 10-2016-0178845

(51) Int. Cl.
*G07C 5/00* (2006.01)
*G07C 5/08* (2006.01)
*B60W 20/00* (2016.01)

(52) U.S. Cl.
CPC ............. *G07C 5/006* (2013.01); *B60W 20/00* (2013.01); *G07C 5/0808* (2013.01); *G07C 5/0816* (2013.01)

(58) Field of Classification Search
CPC ..... G07C 5/006; G07C 5/0816; G07C 5/0808
USPC ........................................................ 701/34.4
See application file for complete search history.

(56) References Cited

U.S. PATENT DOCUMENTS

| | | | |
|---|---|---|---|
| 7,571,662 B2 * | 8/2009 | Pickering ............... | B60K 37/06 74/473.3 |
| 2007/0173983 A1 * | 7/2007 | Takahashi ................ | B60R 1/00 701/1 |
| 2008/0046101 A1 * | 2/2008 | Klein ..................... | B60K 37/06 700/29 |
| 2010/0283731 A1 | 11/2010 | Grant et al. | |

FOREIGN PATENT DOCUMENTS

| | | |
|---|---|---|
| JP | 2000-138018 A | 5/2000 |
| JP | 2005-166292 A | 6/2005 |
| JP | 2007-250391 A | 9/2007 |
| KR | 10-1589345 B1 | 1/2016 |

* cited by examiner

*Primary Examiner* — Khoi H Tran
*Assistant Examiner* — Rodney P King
(74) *Attorney, Agent, or Firm* — Morgan, Lewis & Bockius LLP

(57) ABSTRACT

A vehicle includes: an input interface configured to receive a control command for a target module that is a target to be controlled among a plurality of vehicle modules; a sensor portion configured to sense a state of the target module; and a controller configured to change a shape of the input interface based on the sensed state of the target module.

16 Claims, 13 Drawing Sheets

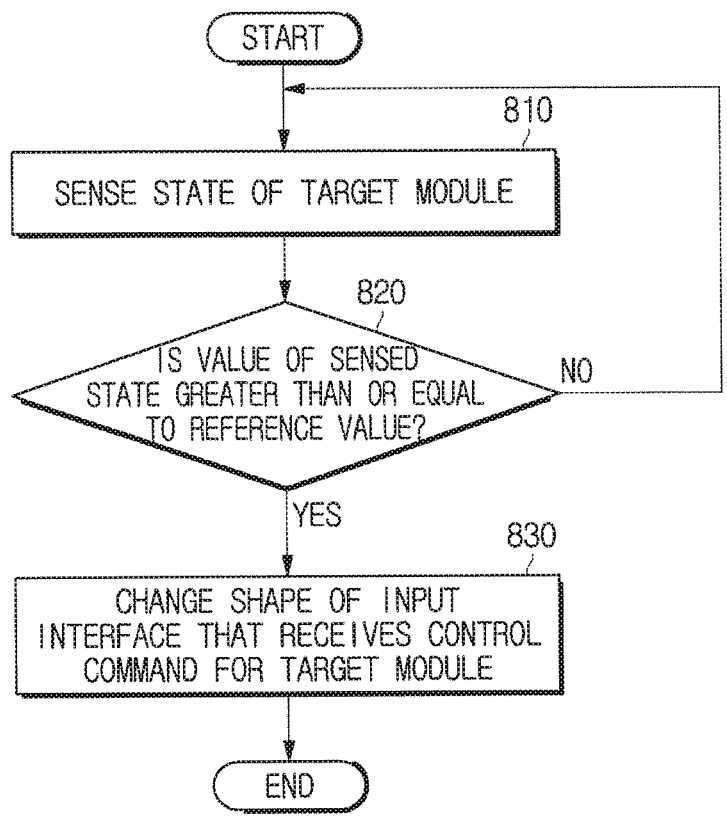

SYSTEM FOR CONTROLLING INPUT INTERFACE FOR RECEIVING CONTROL COMMAND OF VEHICLE AND CONTROL METHOD THEREOF

CROSS-REFERENCE TO RELATED APPLICATION

This application claims the benefit of priority to Korean Patent Application No. 10-2016-0178845, filed on Dec. 26, 2016 in the Korean Intellectual Property Office, the disclosure of which is incorporated herein by reference.

TECHNICAL FIELD

The present disclosure relates to a vehicle having an input interface for receiving control commands, and a control method thereof.

BACKGROUND

With the development of technologies, a vehicle can provide various functions for a passenger's convenience in addition to a driving function. In order to provide various functions, the vehicle has a combination of a plurality of modules for providing the functions.

A driver needs to check the states of the plurality of modules periodically in order to maintain and manage the vehicle. Accordingly, the vehicle outputs information about the states of the plurality of modules visually and aurally, thereby helping the driver recognize the states of the modules.

For example, if the vehicle determines that the abrasion of a specific component constituting a module is too deep for the vehicle to travel normally, the vehicle informs the driver of the result of the determination to induce the driver to replace the component. The vehicle displays the amount of fuel on the cluster to thereby inform the amount of fuel visually.

Further, the vehicle can inform the driver of information about the states of the modules using a more intuitive method such as a haptic feedback.

SUMMARY

An aspect of the present disclosure provides a vehicle capable of changing the shape of an input interface for receiving control commands for a target module, according to the state of the target module, and a method of controlling the vehicle.

Additional aspects of the disclosure will be set forth in part in the description which follows and, in part, will be obvious from the description, or may be learned by practice of the disclosure.

In accordance with an exemplary embodiment of the present disclosure, a vehicle includes: an input interface configured to receive a control command for a target module that is a target to be controlled among a plurality of vehicle modules; a sensor portion configured to sense a state of the target module; and a controller configured to change a shape of the input interface based on the sensed state of the target module.

The sensor portion may sense the state of the target module, and digitizes a sensing result into a state value.

The controller may compare the state value to a predetermined reference value, and changes the shape of the input interface according to a comparison result.

The controller may change the shape of the input interface in proportion to the state value.

The controller may change a volume of the input interface based on the sensed state.

The sensor portion may sense an amount of abrasion of a brake lining included in a brake module of the vehicle, as the target module.

The controller may change a shape of a brake lever to receive a control command for the brake module, based on the amount of abrasion of the brake lining.

The sensor portion may sense an amount of fuel stored in a fuel storage module of the vehicle, as the target module.

The controller may change a shape of a fuel filler opening button to receive a control command for the fuel storage module, based on the amount of fuel stored in the fuel storage module.

The sensor portion may sense a frequency of steering changes of a steering module of the vehicle, as the target module.

The controller may change a shape of a steering wheel to receive a control command for the steering module, based on the frequency of steering changes.

In accordance with another aspect of the present disclosure, a method of controlling a vehicle, the vehicle including an input interface to receive a control command for a target module that is a target to be controlled among a plurality of modules constituting a vehicle, the method includes: sensing a state of the target module; and changing a shape of the input interface based on the sensed state of the target module.

The step of sensing the state of the target module may comprise sensing the state of the target module, and digitizing a sensing result into a state value.

The step of changing the shape of the input interface may comprise comparing the state value to a predetermined reference value, and changing the shape of the input interface according to a comparison result.

The step of changing the shape of the input interface may comprise changing the shape of the input interface in proportion to the state value.

The step of changing the shape of the input interface may comprise changing a volume of the input interface based on the sensed state.

The step of sensing the state of the target module may comprise sensing an amount of abrasion of a brake lining included in a brake module of the vehicle, as the target module.

The step of changing the shape of the input interface may comprise changing a shape of a brake lever to receive a control command for the brake module, based on the amount of abrasion of the brake lining.

The step of sensing the state of the target module may comprise sensing an amount of fuel stored in a fuel storage module of the vehicle, as the target module.

The step of changing the shape of the input interface may comprise changing a shape of a fuel filler opening button to receive a control command for the fuel storage module, based on the amount of fuel stored in the fuel storage module.

The step of sensing the state of the target module may comprise sensing a frequency of steering changes of a steering module of the vehicle, as the target module.

The step of changing the shape of the input interface may comprise changing a shape of a steering wheel to receive a control command for the steering module, based on the frequency of steering changes.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 7 is a flowchart illustrating a method of controlling the vehicle according to an embodiment of the present disclosure.

DETAILED DESCRIPTION

Figure 1A:
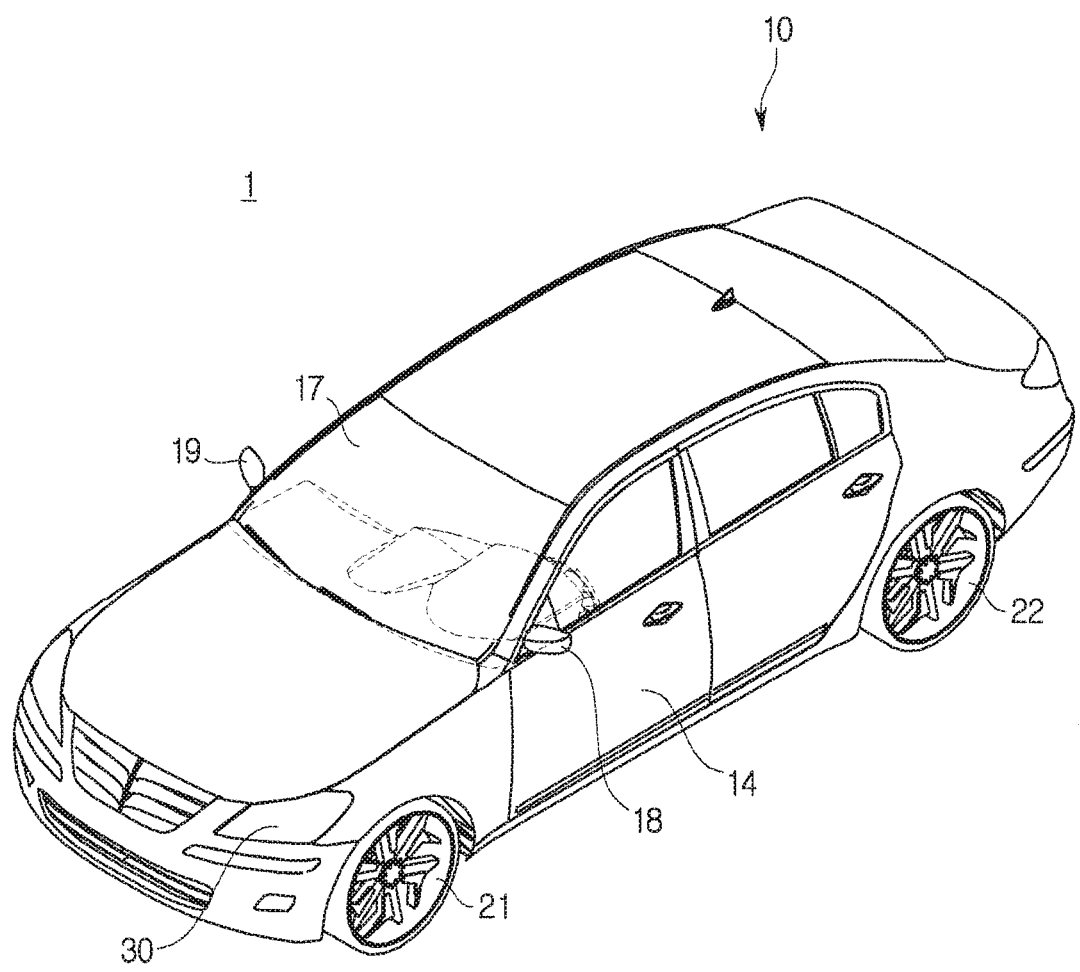
FIGS. 1A and 1B show appearances of vehicles according to various embodiments of the present disclosure.

Like numbers refer to like elements throughout this specification. This specification does not describe all components of the embodiments, and general information in the technical field to which the present disclosure belongs or overlapping information between the embodiments will not be described. The terms "part", "module", "element", and "block", as used herein, may be implemented as software or hardware, and according to embodiments, a plurality of "part", "module", "element", and "block" may be implemented as a single component, or a single "part", "module", "element", and "block" may include a plurality of components.

It will be understood that when a component is referred to as being "connected" to another component, it can be directly or indirectly connected to the other component. When a component is indirectly connected to another component, it may be connected to the other component through a wireless communication network.

Also, it will be understood that when the terms "includes," "comprises," "including," and/or "comprising," when used in this specification, specify the presence of a stated component, but do not preclude the presence or addition of one or more other components.

It will be understood that, although the terms first, second, etc. may be used herein to describe various components, these components should not be limited by these terms. These terms are only used to distinguish one component from another.

It is to be understood that the singular forms "a," "an," and "the" include plural referents unless the context clearly dictates otherwise.

Reference numerals used in operations are provided for convenience of description, without describing the order of the operations, and the operations can be executed in a different order from the stated order unless a specific order is definitely specified in the context.

Hereinafter, a vehicle and a control method thereof will be described in detail with reference to the accompanying drawings.

Figure 1B:
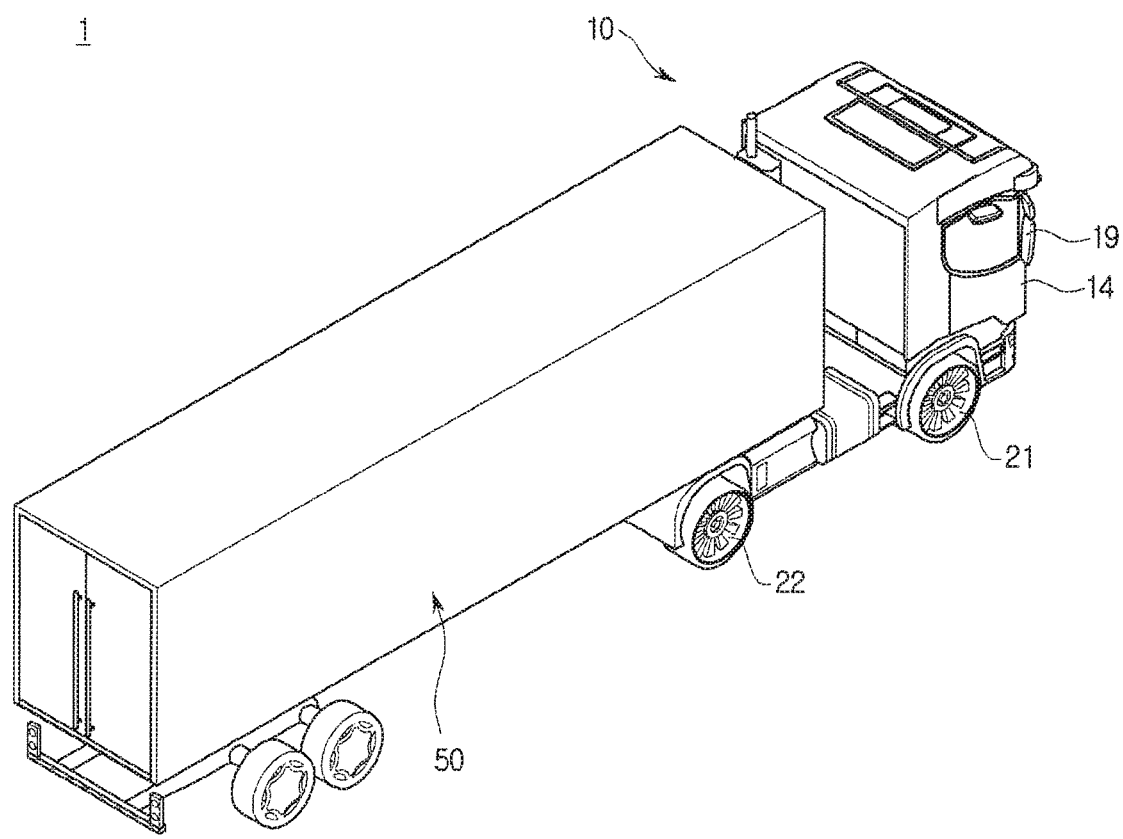

FIGS. 1A and 1B show the appearances of vehicles according to various embodiments of the present disclosure.

As shown in FIG. 1A, a vehicle 1 according to an embodiment of the present disclosure may include a main body 10 forming the outer appearance of the vehicle 1, wheels 21 and 22 to move the vehicle 1, doors 14 to shield the interior of the vehicle 1 from the outside, a front glass 17 to provide a driver inside the vehicle 1 with a front view of the vehicle 1, and side-view mirrors 18 and 19 to provide the driver with rear views of the vehicle 1.

The wheels 21 and 22 may include front wheels 21 provided in the front part of the vehicle 1, and rear wheels 22 provided in the rear part of the vehicle 1. The front wheels 21 and the rear wheels 22 may receive rotatory power from a driving apparatus that will be described later, to move the main body 10 forward or backward.

The doors 14 may be rotatably provided to the left and right of the main body 10 to allow the driver to open one of them and get into the vehicle 1. Also, the doors 14 may shield the interior of the vehicle 1 from the outside when all of them close.

The front glass 17 may be provided in the upper, front part of the main body 10 to allow the driver inside the vehicle 1 to acquire a front view of the vehicle 1. The front glass 17 is also called a windshield glass.

The side-view mirrors 18 and 19 may include a left side-view mirror 18 provided to the left of the main body 10 and a right side-view mirror 19 provided to the right of the main body 10 to allow the driver inside the vehicle 1 to acquire side and rear views of the vehicle 1.

Unlike the vehicle 1 shown in FIG. 1A, the vehicle 1 according to the current embodiment may be implemented as a commercial vehicle used to transport goods or passengers. The commercial vehicle may include a truck, a dump truck, a van, and a forklift, which are used to transport goods, and a bus and a taxi, which are used to transport passengers.

FIG. 1B shows an example in which the vehicle 1 is implemented as a commercial vehicle including a tractor 10 that is a main body coupled with a trailer 50. The vehicle 1 shown in FIG. 1B may be similar to the vehicle 1 shown in FIG. 1A, except that the tractor 10 having a power source is combined with the nonpowered trailer 50 to move together with the trailer 50. Accordingly, detailed descriptions about the same components as those of the vehicle 1 of FIG. 1A will be omitted.

Figure 2:
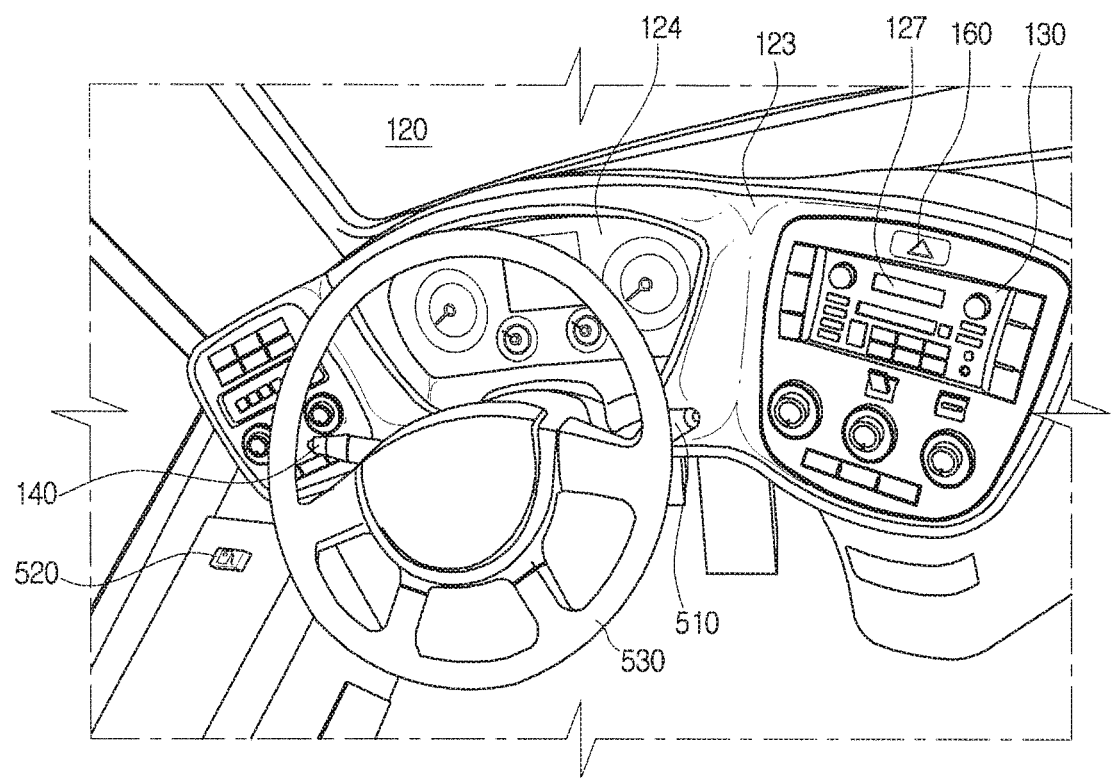
FIG. 2 shows the interior of the vehicle according to the embodiments of FIG. 1B.

FIG. 2 shows an interior of the vehicle according to the embodiment of FIG. 1B.

In the interior of the vehicle 1, a driver seat 120 on which a driver sits, and at least one passenger seat on which a passenger except for the driver sits may be provided. The driver seat 120 may include a seat on which the driver can sit, and various components for enabling the driver to manipulate the vehicle 1 may be disposed around the driver seat 120. The at least one passenger seat may be positioned at an arbitrary location inside the vehicle 1. For example, the passenger seat may be positioned to one side of the driver seat 120, or behind the driver seat 120. A plurality of passenger seats may be arranged in a line to both sides of the inside of the vehicle 1 such that a passage is made in the center of the inside of the vehicle 1.

Referring to FIG. 2, around the driver seat 120, a dashboard 123, a cluster (that is, an instrument panel 124) disposed on the dashboard 123 to guide driving functions and vehicle information, such as speed, revolutions per minute (RPM) of the engine, the amount of oil, and cooling water, and a steering wheel 530 to enable the driver to change the heading direction of the vehicle 1 may be disposed.

More specifically, the cluster 124 may be implemented in a digital form. The cluster 124 in the digital form may display vehicle information and driving information as images.

On the dashboard 123, input devices may be disposed to control indoor lamps, an air conditioner, a Bluetooth apparatus, opening/closing of the doors 14, etc. Also, a display 127 for displaying operation information for at least one function, and audio system 130 for outputting sound may be further disposed on the dashboard 123. Also, navigation system (not shown) may be further disposed on the dashboard 123, and the navigation system may be embedded into or put on the dashboard 123.

The vehicle 1 may include various input interfaces to receive control commands for various modules. The driver may need to accurately recognize the states of various modules constituting the vehicle 1 in order to maintain and manage the vehicle 1. For this, the vehicle 1 according to the current embodiment may use various input interfaces provided therein.

In exemplary embodiments of the present disclosure, the various modules may include an electronic control unit (ECU), such as an engine control module (ECM), a powertrain control module (PCM), a transmission control module (TCM), etc.

As described above, around the driver seat 120 of the vehicle 1, an input interface may be disposed to receive various inputs for controlling the vehicle 1. For example, referring to FIG. 2, the steering wheel 530 for enabling the driver to change the heading direction of the vehicle 1 may be disposed around the driver seat 120, and a turn signal lamp lever 140 for receiving an operation command for operating any one of turn signal lamps 30, and a retarder lever 510 for receiving a braking command for the vehicle 1 may be disposed on the steering wheel 125. Also, an emergency lamp turning-on button 160 for receiving an operation command for making all of the turn signal lamps 30 flickering may be disposed on the dashboard 123.

Since the input interface can receive a control command for controlling at least one module, the vehicle 1 according to the current embodiment can inform the driver of the state of a specific module through the input interface of receiving a control command for the corresponding module. The operation will be described in detail, below.

Figure 3:
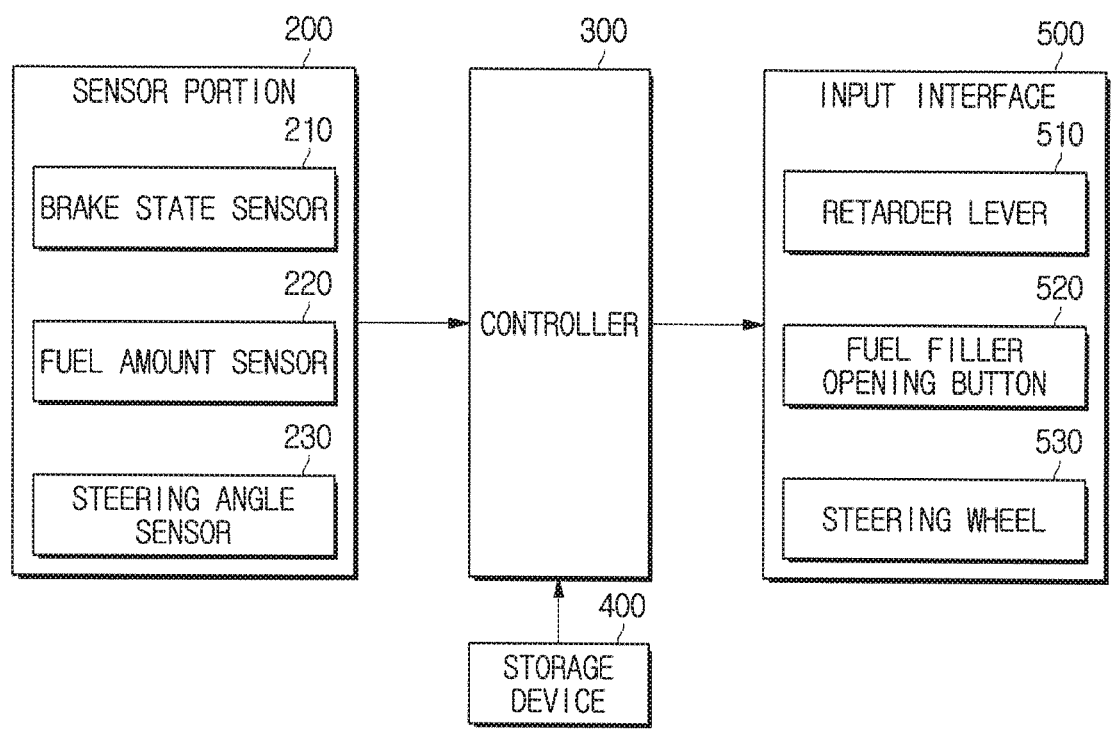
FIG. 3 is a control block diagram of a vehicle according to an embodiment of the present disclosure.

FIG. 3 is a control block diagram of a vehicle according to an embodiment of the present disclosure.

The vehicle 1 according to an embodiment of the present disclosure may include: an input interface 500 configured to receive a control command; a sensor portion 200 configured to sense a state of a target module that is a target to be controlled; a controller 300 configured to control the shape of the input interface 500 according to the state of the target module; and a storage device 400 configured to store information that is used for the control of the controller 300.

The input interface 500 may receive a control command for at least one of a plurality of modules constituting the vehicle 1. Herein, the plurality of modules constituting the vehicle 1 may mean a group of hardware to perform independent functions. For example, the vehicle 1 may include a brake module to perform a braking function, an air-conditioning module to perform an air-conditioning function, a fuel storage module to perform a fuel storage function, and a steering module to perform a steering function.

Hereinafter, a module that is a target to be controlled according to a control command will be referred to as a target module.

Referring to FIG. 3, the input interface 500 according to an embodiment of the present disclosure may include: the retarder lever 510 to receive a control command for the brake module as a target module; a fuel filler opening button 520 to receive a control command for the fuel storage module as a target module; and a steering freewheel 530 to receive a control command for the steering module as a target module, and may further include a temperature adjustment knob to receive a control command for a temperature adjustment module as a target module. However, examples shown in FIG. 3 are an embodiment of the input interface 500. That is, the input interface 500 may include a part of the examples shown in FIG. 3, or may further include another component in addition to the examples shown in FIG. 3.

The retarder lever 510 may receive a brake command as a control command. In FIG. 2, an example in which the retarder lever 510 is disposed to the right of the steering freewheel 530 is shown. When the driver wants to decelerate or stop the vehicle 1 during driving, the driver may change the position of the retarder lever 510 to input a braking command.

The fuel filler opening button 520 may receive a fuel filler opening command as a control command. When the driver wants to fill fuel in the fuel storage module, the driver may press the fuel filler opening button 520 to open the fuel filler, and fill fuel in the fuel storage module through the fuel filler.

The steering freewheel 530 may receive a steering command as a control command. In order to receive a steering command, the center of the steering freewheel 530 may be rotatably fixed. The driver may rotate the steering freewheel 530 in a direction corresponding to a direction in which he/she wants to move the vehicle 1, thereby inputting a steering command.

The temperature adjustment knob may receive a temperature adjustment command as a control command. In order to receive a temperature adjustment command, the temperature adjustment knob may be rotatable. The driver may rotate the temperature adjustment knob in a direction for setting desired temperature, thereby inputting a temperature adjustment command.

The sensor portion 200 may sense the state of at least one of the plurality of modules constituting the vehicle 1, and digitize the result of the sensing to output an electrical signal. Herein, the state may include all direct/indirect information about the module.

More specifically, the sensor portion 200 according to an embodiment may include: a brake state sensor 210 to sense the states of members constituting the brake module; a fuel amount sensor 220 to sense an amount of fuel stored in the fuel storage module; and a steering angle sensor 230 to sense a steering angle made by the steering module, and may further include a temperature sensor to sense the inside temperature of the vehicle 1, decided by the temperature adjustment module. FIG. 3 shows an embodiment of the sensor portion 200, and the sensor portion 200 may include a part of the examples shown in FIG. 3, or further include another component in addition to the examples shown in FIG. 3.

The brake state sensor 210 may sense the states (for example, the amounts of abrasion) of a brake lining, a disc, a pad, etc. For example, the brake state sensor 210 may digitize the amounts of abrasion of the members constituting the brake module, and output the digitized values.

The fuel amount sensor 220 may sense the amount of fuel stored in the fuel storage module. More specifically, the fuel amount sensor 220 may digitize the amount of fuel stored in the fuel storage module, and output the digitized value.

The steering angle sensor 230 may sense the frequency of steering changes, together with a steering angle made by the steering module. More specifically, the steering angle sensor 230 may digitize a steering angle, output the digitized value, and simultaneously output the frequency of steering changes.

The temperature sensor may sense the inside temperature of the vehicle 1, decided by the temperature adjustment module. More specifically, the temperature sensor may sense the inside temperature of the vehicle 1, digitize the sensed inside temperature, and output the digitized value.

The states sensed by the sensor portion 200 may be stored in the storage device 400, and then provided to the controller 300.

The controller 300 may control the shape of the input interface 500 from which a control command for a module (that is, a target module) whose state has been sensed is received, based on the state sensed by the sensor portion 200.

Herein, the shape of the input interface 500 may mean the outer appearance of the input interface 500. The controller 300 according to an embodiment may change at least one of the volume, thickness, height, diameter, and width of the input interface 500, as the shape of the input interface 500.

The controller 300 may compare the digitized value (hereinafter, simply referred to as a state value) of the sensed state to a predetermined reference value, and determine whether to change the shape of the input interface 500. For example, if the controller 300 determines that the state value is greater than or equal to the reference value, the controller 300 may change the shape of the input interface 500.

The controller 300 may change the physical quantity of the input interface 500 in proportion to the state value. For example, as the state value increases, the controller 300 may increase the physical quantity of the input interface 500.

Hereinafter, various embodiments in which the controller 300 changes the shape of the input interface 500 will be described with reference to FIGS. 4A to 4C, FIGS. 5A and 5B, and FIGS. 6A and 6B.

Figure 4A:
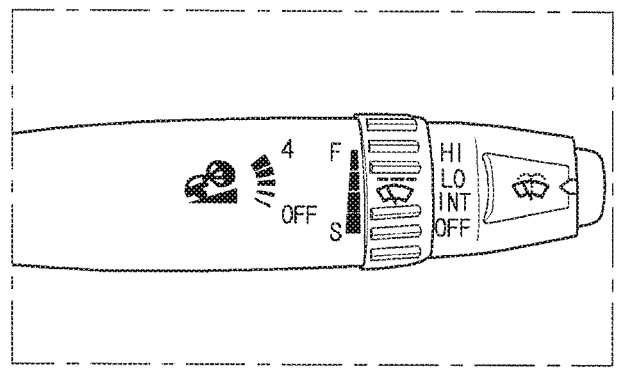
FIGS. 4A to 4C are views for describing a method in which the controller according to an embodiment changes the shape of the retarder lever.
Figure 4B:
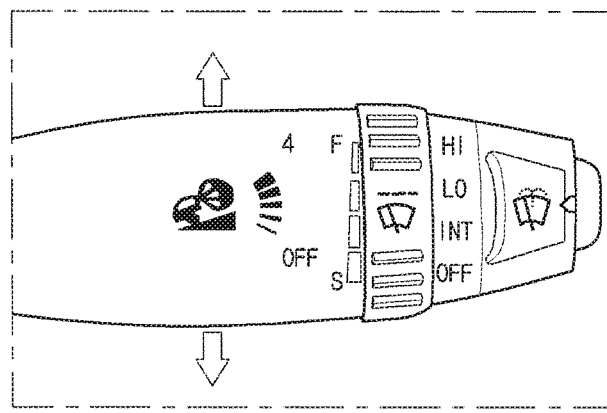
Figure 4C:
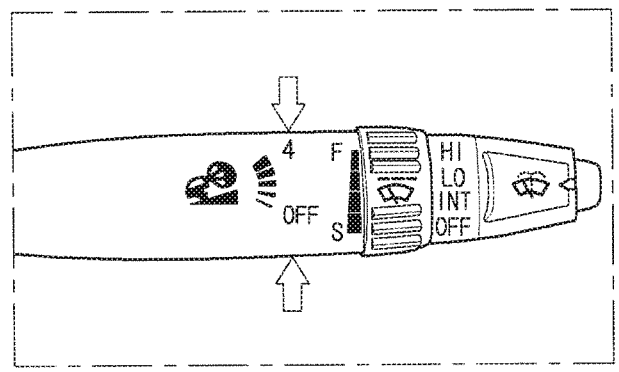

FIGS. 4A to 4C are views for describing a method in which the controller 300 according to an embodiment changes the shape of the retarder lever 510.

FIG. 4A shows the retarder lever 510 in a normal state. In this state, the sensor portion 200 may sense the state of the brake module that is a target module for a control command received by the retarder lever 510. For example, the sensor portion 200 may sense the amount of abrasion of the brake lining included in the brake module.

If the sensed amount of abrasion is smaller than a first reference value, the controller 300 may increase the volume of the retarder lever 510. FIG. 4B shows the retarder lever 510 when the volume of the retarder lever 510 increases. The driver may visually check the volume of the retarder lever 510, or grip the retarder lever 510 with his/her hand to check the volume of the retarder lever 510 tactually, thereby intuitively recognizing that the amount of abrasion of the brake lining included in the brake module that is a target module for a control command received by the retarder lever 510 is low.

In contrast, if the sensed amount of abrasion is greater than or equal to a second reference value that is greater than the first reference value, the controller 300 may reduce the volume of the retarder lever 510. FIG. 4C shows the retarder lever 510 when the volume of the retarder lever 510 is reduced. The driver may visually check the volume of the retarder lever 510, or grip the retarder lever 510 with his/her hand to check the volume of the retarder lever 510 tactually, thereby intuitively recognizing that the amount of abrasion of the brake lining included in the brake module that is a target module for a control command received by the retarder lever 510 is high.

In this way, the driver can easily recognize the amount of abrasion of the brake lining all the time by checking the volume of the retarder lever 510.

In FIGS. 4A to 4C, a case in which the controller 300 changes the shape of the retarder lever 510 based on a reference value is shown. However, the controller 300 may reduce the volume of the retarder lever 510, as the amount of abrasion of the brake lining increases.

Figure 5A:
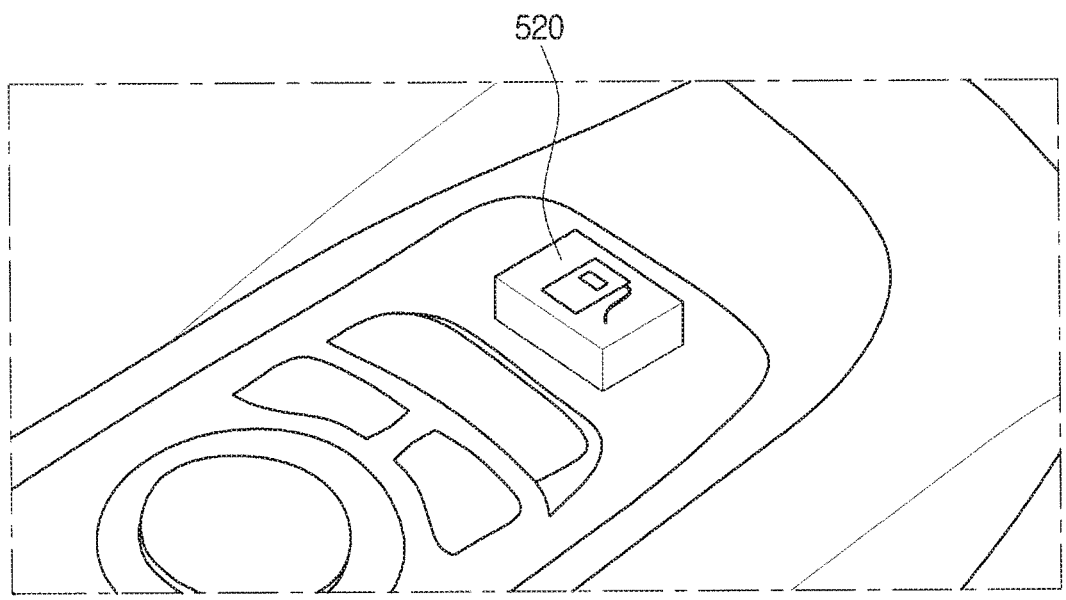
FIGS. 5A and 5B are views for describing a method in which the controller according to an embodiment changes the shape of the fuel filler opening button.
Figure 5B:
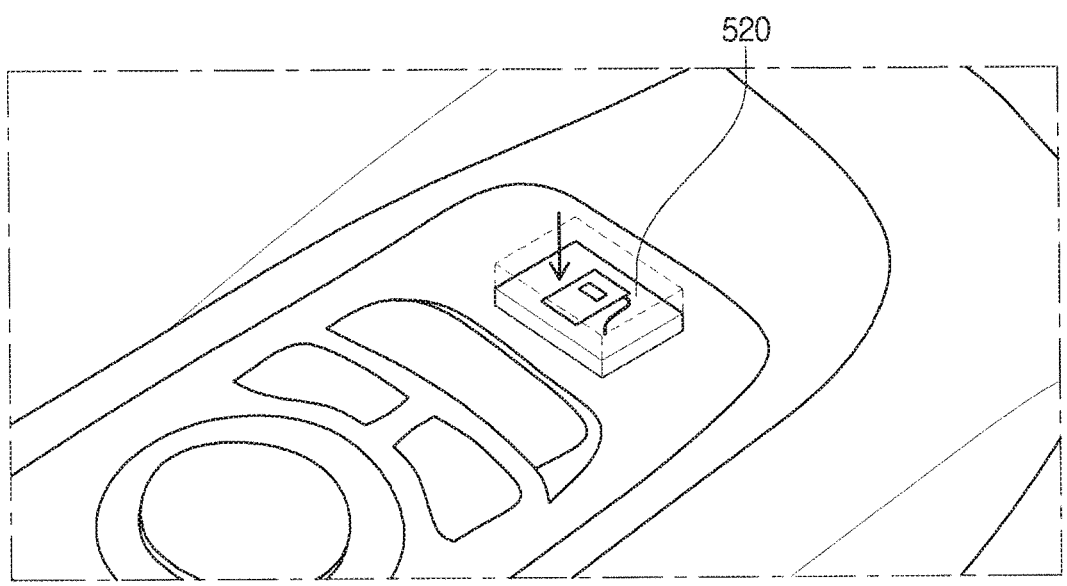

FIGS. 5A and 5B are views for describing a method in which the controller 300 according to an embodiment changes the shape of the fuel filler opening button 520.

As described above with reference to FIG. 2, the fuel filler opening button 520 may be disposed around the driver seat 120 inside the vehicle 1. FIG. 5A shows the fuel filler opening button 520 in a normal state. In this state, the sensor portion 200 may sense the state of the fuel storage module which is a target module for a control command received by the fuel filler opening button 520. For example, the sensor portion 200 may sense the amount of fuel stored in the fuel storage module.

If the sensed amount of fuel is smaller than a third reference value, the controller 300 may reduce the volume of the fuel filler opening button 520 in a predetermined direction to thus reduce the height of the fuel filler opening button 520. FIG. 5B shows the fuel filler opening button 520 when the height of the fuel filler opening button 520 is reduced. The driver may visually check the height of the fuel filler opening button 520, or grip the fuel filler opening button 520 with his/her hand to check the height of the fuel filler opening button 520 tactually, thereby intuitively recognizing that the amount of fuel stored in the fuel storage module that is a target module for a control command received by the fuel filler opening button 520 is low.

In this way, the driver can easily recognize the amount of stored fuel all the time by checking the height of the fuel filler opening button 520.

In FIGS. 5A and 5B, a case in which the controller 300 changes the shape of the fuel filler opening button 520 based on a reference value is shown. However, the controller 300 can reduce the volume of the fuel filler opening button 520, as the amount of stored fuel is reduced.

The controller 300 may change the reaction force of the fuel filler opening button 520 according to the amount of stored fuel. For example, if the amount of stored fuel is smaller than the third reference value, the controller 300 may reduce the reaction force of the fuel filling opening button 520. Also, the controller 300 may reduce the reaction force of the fuel filler opening button 520, as the amount of stored fuel is reduced.

As a result, the driver can intuitively recognize the amount of fuel stored in the fuel storage module, when pressing the fuel filler opening button 520.

Figure 6A:
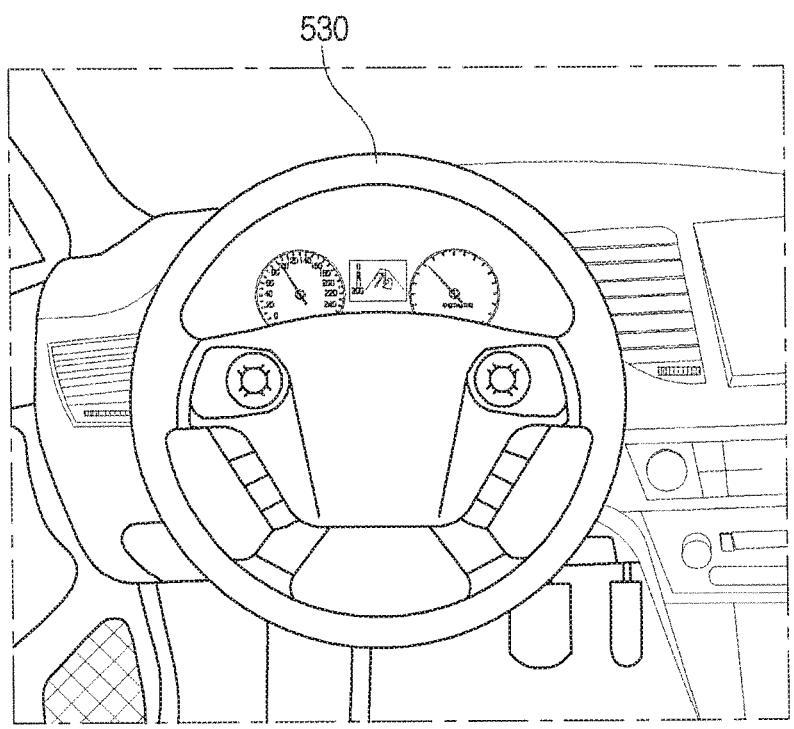
FIGS. 6A and 6B are views for describing a method in which the controller according to an embodiment changes the shape of the steering freewheel.
Figure 6B:
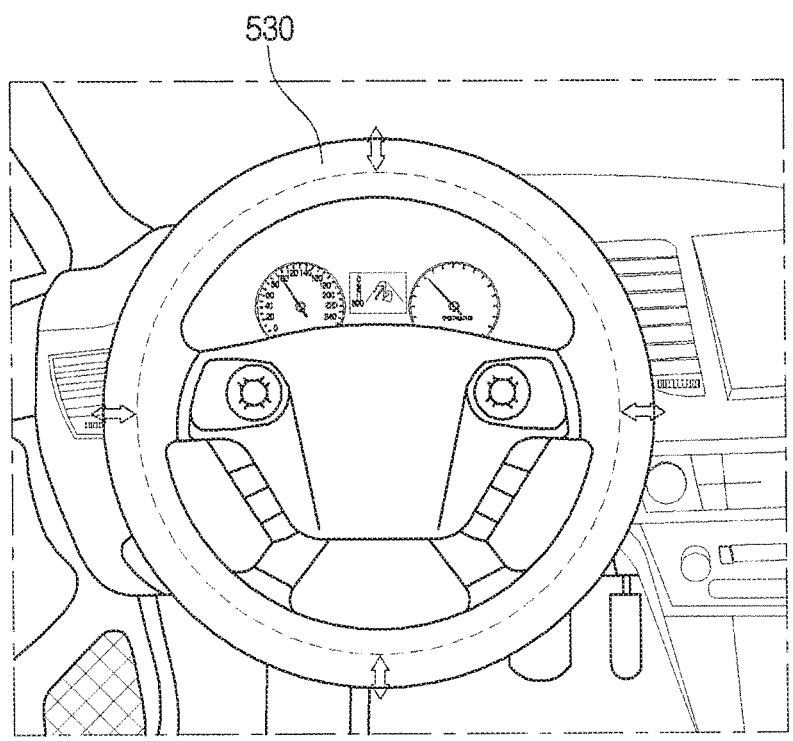

FIGS. 6A and 6B are views for describing a method in which the controller 300 according to an embodiment changes the shape of the steering freewheel 530.

As described above with reference to FIG. 2, the steering freewheel 530 may be disposed around the driver seat 120 inside the vehicle 1. FIG. 6A shows the steering freewheel 530 in a normal state. In this state, the sensor portion 200 may sense the state of the steering module which is a target module for a control command received by the steering freewheel 530. For example, the sensor portion 200 may sense a steering angle of the steering module, and the frequency of steering changes.

If the sensed frequency of steering changes is greater than or equal to a fourth reference value, the controller 300 may increase the volume of the steering freewheel 530, more specifically, the rim of the steering freewheel 530. FIG. 6B shows the steering freewheel 530 when the volume of the steering freewheel 530 increases. The driver may visually check the volume of the rim of the steering freewheel 530 or grip the rim of the steering freewheel 530 with his/her hand to check the volume of the rim tactually, thereby intuitively recognizing that the frequency of steering changes by the steering module that is a target module for a control command received by the steering freewheel 530 is high.

In this way, the driver can easily recognize the frequency of steering changes all the time by checking the volume of the steering freewheel 530.

In FIGS. 6A and 6B, a case in which the controller 300 changes the shape of the steering freewheel 530 based on a reference value is shown. However, the controller 300 may increase the volume of the steering freewheel 530, as the frequency of steering changes increases.

The controller 300 may change the reaction force of the steering freewheel 530 according to the frequency of steering changes. For example, if the frequency of steering changes is greater than or equal to the fourth reference value, the controller 300 may increase the reaction force of the steering freewheel 530. Also, the controller 300 may increase the reaction force of the steering freewheel 530, as the frequency of steering changes increases.

As a result, the driver can intuitively recognize a pattern of steering changes, when rotating the steering freewheel 530.

The controller 300 may change the shape of the steering freewheel 530 based on fuel efficiency. For example, if the fuel efficiency of the vehicle 1 is smaller than a fifth reference value, the controller 300 may reduce the volume of the steering freewheel 530. The controller 300 may reduce the volume of the steering freewheel 530, as the fuel efficiency of the vehicle 1 is reduced.

The controller 300 may change the shape of the temperature adjustment module according to the state of the temperature adjustment module that is a target module for a control command received by the temperature adjustment knob.

More specifically, the sensor portion 200 may sense the inside temperature of the vehicle 1, decided by the temperature adjustment module. If a difference between the sensed inside temperature of the vehicle 1 and set temperature is greater than or equal to a sixth reference value, the controller 300 may increase the volume of the temperature adjustment knob. The driver may visually check the volume of the temperature adjustment knob, or grip the temperature adjustment knob with his/her hand to check the volume of the temperature adjustment knob tactually, thereby intuitively recognizing that the inside temperature of the vehicle 1, decided by the temperature adjustment module that is a target module for a control command received by the temperature adjustment knob, is significantly different from the set temperature.

In this way, the driver can easily recognize the inside temperature of the vehicle 1 all the time by checking the volume of the temperature adjustment knob.

The controller 300 may increase the volume of the temperature adjustment knob, as a difference between the inside temperature and the set temperature increases.

Further, the controller 300 may change the reaction force of the temperature adjustment knob according to the difference between the inside temperature and the set temperature. For example, if the difference between the inside temperature and the set temperature is greater than or equal to the sixth reference value, the controller 300 may increase the reaction force of the temperature adjustment knob. The controller 300 may increase the reaction force of the temperature adjustment knob, as the difference in temperature increases.

As a result, the driver can intuitively recognize the difference between the inside temperature and the set temperature, when rotating the temperature adjustment knob.

FIG. 7 is a flowchart illustrating a method of controlling a vehicle according to an embodiment of the present disclosure.

First, the vehicle 1 may sense the state of a target module, in operation 810. Herein, the target module may mean a module in the vehicle 1, which is a target for a control command received by the input interface 500. The state may include all direct/indirect information about the target module. At this time, the vehicle 1 may digitize the sensed state, and output the digitized value (hereinafter, simply referred to as a state value).

Then, the vehicle 1 may determine whether the state value is greater than or equal to a reference value, in operation 820. If the vehicle 1 determines that the state value is smaller than the reference value, the vehicle 1 may continue to sense the state of the target module.

In contrast, if the vehicle 1 determines that the state value is greater than or equal to the reference value, the vehicle 1 may change the shape of the input interface 500 that receives a control command for the target module, in operation 830.

Thereby, a driver can intuitively recognize the state of the target module.

Figure 8:
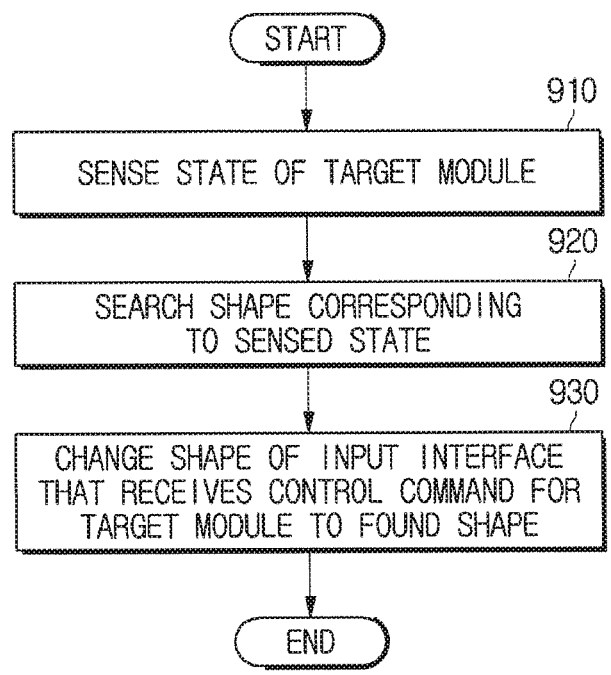
FIG. 8 is a flowchart illustrating a method of controlling the vehicle according to another embodiment of the present disclosure.

FIG. 8 is a flowchart illustrating a method of controlling the vehicle 1 according to another embodiment of the present disclosure.

First, the vehicle 1 may sense the state of a target module, in operation 910. Herein, the target module may mean a module in the vehicle 1, which is a target for a control command received by the input interface 500. Also, the state may include all direct/indirect information about the target module. At this time, the vehicle 1 may digitize the sensed state, and output the digitized value (hereinafter, simply referred to as a state value).

Then, the vehicle 1 may search a shape corresponding to the sensed state, in operation 920. The shape corresponding to the sensed state may have been stored in advance in the storage device 400.

Finally, the vehicle 1 may change the shape of the input interface 500 that receives a control command for the target module, to the found shape, in operation 930.

Thereby, the driver can intuitively recognize the state of the target module.

According to the embodiments of the vehicle and the control method thereof as described above, a driver can easily recognize the state of a vehicle module that is a target to be controlled, through the input interface that receives control commands for the corresponding vehicle module. Particularly, by changing the shape of the input interface to a shape corresponding to a digitized state value, the driver can intuitively recognize the state of a module that is to be controlled.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
an input interface configured to receive a control command for a target module that is a target to be controlled among a plurality of vehicle modules;
a sensor configured to sense a state of the target module; and
a controller configured to change a shape of the input interface based on the sensed state of the target module,
wherein the controller changes a volume of the input interface based on the sensed state, wherein the sensor senses the state of the target module, and digitizes a sensing result into a state value, and wherein the controller changes the shape of the input interface in proportion to the state value.

2. The vehicle according to claim 1, wherein the controller compares the state value to a reference value, and changes the shape of the input interface according to a comparison result.

3. The vehicle according to claim 1, wherein the sensor senses an amount of abrasion of a brake lining included in a brake module of the vehicle, as the target module.

4. The vehicle according to claim 3, wherein the controller changes a shape of a brake lever to receive a control command for the brake module, based on the amount of abrasion of the brake lining.

5. The vehicle according to claim 1, wherein the sensor senses an amount of fuel stored in a fuel storage module of the vehicle, as the target module.

6. The vehicle according to claim 5, wherein the controller changes a shape of a fuel filler opening button to receive a control command for the fuel storage module, based on the amount of fuel stored in the fuel storage module.

7. The vehicle according to claim 1, wherein the sensor senses a frequency of steering changes of a steering module of the vehicle, as the target module.

8. The vehicle according to claim 7, wherein the controller changes a shape of a steering wheel to receive a control command for the steering module, based on the frequency of steering changes.

9. A method of controlling a vehicle, the vehicle including an input interface to receive a control command for a target module that is a target to be controlled among a plurality of modules, the method comprising steps of:
sensing a state of the target module; and
changing a shape of the input interface based on the sensed state of the target module,
wherein the step of changing the shape of the input interface comprises changing a volume of the input interface based on the sensed state, wherein the step of changing the shape of the input interface comprises changing a volume of the input interface based on the sensed state, wherein the step of sensing the state of the target module comprises: sensing the state of the target module; and digitizing a sensing result into a state value, and wherein the step of changing the shape of the input interface comprises changing the shape of the input interface in proportion to the state value.

10. The method according to claim 9, wherein the step of changing the shape of the input interface comprises:
comparing the state value to a reference value; and
changing the shape of the input interface according to a comparison result.

11. The method according to claim 9, wherein the step of sensing the state of the target module comprises sensing an amount of abrasion of a brake lining included in a brake module of the vehicle, as the target module.

12. The method according to claim 11, wherein the step of changing the shape of the input interface comprises changing a shape of a brake lever to receive a control command for the brake module, based on the amount of abrasion of the brake lining.

13. The method according to claim 11, wherein the step of sensing the state of the target module comprises sensing an amount of fuel stored in a fuel storage module of the vehicle, as the target module.

14. The method according to claim 13, wherein the step of changing the shape of the input interface comprises changing a shape of a fuel filler opening button to receive a control command for the fuel storage module, based on the amount of fuel stored in the fuel storage module.

15. The method according to claim 9, wherein the step of sensing the state of the target module comprises sensing a frequency of steering changes of a steering module of the vehicle, as the target module.

16. The method according to claim 15, wherein the step of changing the shape of the input interface comprises changing a shape of a steering wheel to receive a control command for the steering module, based on the frequency of steering changes.

* * * * *